(12) United States Patent
Shope et al.

(10) Patent No.: US 6,524,509 B1
(45) Date of Patent: Feb. 25, 2003

(54) METHOD FOR CASTING MULTICOLORED PARTS FOR AUTOMOTIVE INTERIOR APPLICATIONS

(75) Inventors: Gene Shope, Barrington, NH (US); John Gray, Union, NH (US); Stephen D. Farrington, Kingston, NH (US)

(73) Assignee: Textron Automotive Company Inc., Troy, MI (US)

( * ) Notice: Subject to any disclaimer, the term of this patent is extended or adjusted under 35 U.S.C. 154(b) by 252 days.

(21) Appl. No.: 09/639,727

(22) Filed: Aug. 16, 2000

(51) Int. Cl.$^7$ .................. B29C 39/12; B29C 4/18; B29B 7/22
(52) U.S. Cl. ............. 264/246; 264/113; 264/255; 264/302; 264/328.7; 264/DIG. 60
(58) Field of Search ............... 264/246, 245, 264/247, 255, DIG. 60, 296, 119, 126, 113, 302, 328.7, 310, 311; 425/112, 458, 130, 435, 434, 425, 256, 260

(56) References Cited

U.S. PATENT DOCUMENTS

| | | | |
|---|---|---|---|
| 3,328,500 A | * 6/1967 | Barnette | |
| 4,252,762 A | * 2/1981 | Stevenson | 264/126 |
| 4,562,025 A | 12/1985 | Gray | 264/126 |
| 4,610,620 A | 9/1986 | Gray | 425/434 |
| 4,634,360 A | 1/1987 | Gray | 425/130 |
| 4,692,293 A | 9/1987 | Gray | 264/245 |
| 4,753,766 A | * 6/1988 | Pinsolle | 264/245 |
| 4,773,844 A | 9/1988 | Bartels et al. | 425/435 |
| 4,780,345 A | * 10/1988 | Gray | 264/245 |
| 4,783,302 A | 11/1988 | Kurimoto | 264/251 |
| 4,900,493 A | 2/1990 | Bartels et al. | 264/71 |
| 4,925,151 A | 5/1990 | Gray | 249/65 |
| 5,046,941 A | * 9/1991 | Batchelder et al. | 425/435 |
| 5,074,773 A | 12/1991 | Tischler | 425/134 |
| 5,093,066 A | * 3/1992 | Batchelder et al. | 264/245 |

(List continued on next page.)

FOREIGN PATENT DOCUMENTS

| | | | |
|---|---|---|---|
| EP | 0339222 A2 | * | 11/1989 |
| JP | 60208210 A | * | 10/1985 |
| JP | 62018230 A | * | 1/1987 |
| JP | 02190314 A | * | 7/1990 |
| JP | 02274511 A | * | 11/1990 |
| JP | 03067620 A | * | 3/1991 |
| JP | 05309675 A | * | 11/1993 |

Primary Examiner—Jan H. Silbaugh
Assistant Examiner—Geoffrey P. Shipsides
(74) Attorney, Agent, or Firm—Grossman, Tucker, Perreault & Pfleger, PLLC

(57) ABSTRACT

The present invention relates to an apparatus/method for making a joint line in a plastic article comprising the steps of providing a mold having a mold surface, providing a gasket in the mold wherein the gasket defines first and second mold spaces, and molding a layer of a plastic material within one of the mold first and second mold spaces. In addition, during molding, the gasket is laterally moved relative to the mold surface in a direction towards that mold space containing the plastic material to therein form a distinct joint line. In alternative embodiment, a method is disclosed herein for making a molded two-colored article comprising the steps of providing a mold having a mold surface, providing a gasket in the mold wherein the gasket defines first and second mold spaces, followed by the molding a layer of a first colored material within one of the mold first and second mold spaces, wherein the first colored material comprises a charge of plastic microspheres having an outside diameter in the range of 0.007" to 0.040", and removing the gasket and molding a layer of a second colored material.

15 Claims, 3 Drawing Sheets

U.S. PATENT DOCUMENTS

| | | | |
|---|---|---|---|
| 5,225,214 A | 7/1993 | Filion | 425/434 |
| 5,234,653 A | 8/1993 | Buzzoni et al. | 264/219 |
| 5,316,715 A | 5/1994 | Gray | 264/245 |
| 5,328,349 A | 7/1994 | Minke et al. | 425/289 |
| 5,395,578 A | 3/1995 | Buzzoni et al. | 264/245 |
| 5,525,274 A | 6/1996 | Grimmer | 264/13 |
| 5,525,284 A | 6/1996 | Grimmer | 264/301 |
| 5,597,586 A | 1/1997 | Wilson et al. | 425/67 |
| 5,654,102 A | 8/1997 | Grimmer | 428/402 |
| 5,662,847 A * | 9/1997 | Uchida et al. | |
| 5,676,381 A | 10/1997 | Buzzoni et al. | 277/34 |
| 5,824,738 A | 10/1998 | Humphrey et al. | 524/715 |
| 5,849,341 A | 12/1998 | Johno et al. | 425/425 |
| 5,922,256 A | 7/1999 | Gallagher et al. | 264/45.5 |
| 5,998,030 A | 12/1999 | Grimmer | 428/402 |
| 6,126,881 A * | 10/2000 | Eckert | 264/245 |
| 6,280,666 B1 * | 8/2001 | Gallagher et al. | 264/245 |
| 6,306,321 B1 * | 10/2001 | Mukai et al. | 264/245 |

\* cited by examiner

ID OF THE INVENTION

This invention relates to a method/apparatus of casting multi-colored parts, and the product produced therefrom, particularly suitable for automotive interior applications, wherein said product provides a distinct two-tone color line to a vehicle occupant.

BACKGROUND OF THE INVENTION

Different methods are known for casting multi-colored parts. One generic method involves simultaneous casting of multiple powdered materials. For a particular version of this method, a material supply box is divided into multiple chambers by virtue of a divider panel which separates or bisects multicolored materials. A gasket which interacts with the mold surface may be attached to the divider panel. Upon casting, the gasket, by virtue of interacting with the mold surface, forms a seal between the respective chambers of the material supply box. Upon removal of the material supply box and gasket, a gap exists between the portions of the casting previously occupied by the gasket. This gap, or joint line, may be filled by spraying additional materials on the area.

A second generic method may also be utilized which involves sequential casting of multiple powdered materials. For a particular version of this method, a mask or divider panel may be applied to a portion of the mold surface while another portion of the mold surface remains exposed. During the first casting, material is applied to the exposed area of the mold surface. The mask or divider panel is then removed and a second material, usually from a second material supply box, is applied to the mold surface previously occupied by the mask. Further, the second cast material may overlap the first cast material either partially or completely.

The following patents were uncovered in a search of the prior art.

| Patent Number | Inventor | Listed Assignee |
| --- | --- | --- |
| 5,849,341 | Johno, et al. | Kansei Corp. |
| 5,676,381 | Buzzoni, et al. | Industrie Ilpea SPA |
| 5,395,578 | Buzzoni, et al. | Industrie Ilpea SPA |
| 5,328,349 | Minke, et al. | Benecke-Kaliko AG |
| 5,316,715 | Gray | Davidson Textron |
| 5,234,653 | Buzzoni, et al. | Industrie Ilpea SPA |
| 5,225,214 | Filion | Davidson Textron |
| 5,074,773 | Tischler | Davidson Textron |
| 4,925,151 | Gray | Davidson Textron |
| 4,900,493 | Bartels, et al. | YMOS |
| 4,783,302 | Kurimoto | Sheller-Globe |
| 4,773,844 | Bartels, et al. | YMOS |
| 4,692,293 | Gray | Ex-Cell-O Corp. |
| 4,634,360 | Gray | Ex-Cell-O Corp. |
| 4,610,620 | Gray | Ex-Cell-O Corp. |
| 4,562,025 | Gray | Ex-Cell-O Corp. |

All of the art noted above describes or depicts a gasket which, when used, moves into contact with the mold surface, then away from contact with the mold surface. The art therefore does not describe, teach or suggest a gasket which moves laterally on the mold surface to refine a joint line. Furthermore, the joint line created above is often refined after molding by post painting.

Attention is also directed to U.S. Pat. Nos. 5,525,274, 5,525,284 and 5,654,102 which are directed to a thermoplastic microsphere for use in roto-casting or slush molding of shells. In addition, attention is also directed to U.S. Pat. No. 5,998,030 which describes spherical particles having a diameter between 0.007"–0.040" formed from melt extruded thermoplastic material formed of a blended and melt extruded thermoplastic along with pigment. In addition, attention is directed to U.S. Pat. No. 5,824,738 which relates to an improved light stable aliphatic polyurethane composition suitable for use as an automotive trim component.

In connection with the above art, similar to the above, although such microspheres have been employed to manufacture thin plastics shells or skins, again, there have been no reports of employing such microspheres and the advantages therein for the prepare a synthetic skin product with a two-tone or multi-tone color pattern.

Accordingly, one principal objective of the invention herein is to manufacture a two-tone article employing the use of spherical particles having a diameter between 0.007–0.040". In addition, it is also an objective of the invention herein is to create a distinct two-tone color line in a vehicle, during casting, eliminating any need to post paint.

More specifically, it is also an objective of the invention herein to develop a casting technique in a powder slush molding process by use of a side-to-side sweeping motion of a bisection gasket which therein provides a crisp two-tone cast line in the final molded part.

SUMMARY OF THE INVENTION

In a first embodiment, the present invention comprises a method for making a joint line in a plastic article comprising the steps of providing a mold having a mold surface, providing a gasket in said mold wherein said gasket defines first and second mold spaces and molding a layer of a plastic material within one of said mold first and second mold spaces and laterally moving said gasket relative to said mold surface in a direction towards said mold space containing said plastic material during molding to therein form said joint line.

In a second embodiment, the present invention relates to a method for making a molded two-colored article comprising the steps of providing a mold having a mold surface, providing a gasket in said mold wherein said gasket defines first and second mold spaces, molding a layer of a first colored material within one of said mold first and second mold spaces wherein said first colored material comprises a charge of plastic microspheres, said microspheres having an outside diameter in the range of 0.007" to 0.040", and removing said gasket and molding a layer of a second colored material.

In a third embodiment, the invention herein relates to a method for making a molded two-colored article comprising the steps of providing a mold having a mold surface, providing a gasket in said mold wherein said gasket defines first and second mold spaces, molding a layer of a first colored material within one of said mold first and second mold spaces, and laterally moving said gasket relative to said mold surface in a direction towards said mold space containing said first colored material.

In apparatus form, the present invention relates to an assembly for molding a plastic shell in an open-ended mold from a charge of polymeric resin material, said assembly comprising an open-ended mold having a mold surface, a charge box adapted to be connected to said open-ended mold to form a closed system for molding said polymer resin material and having a gasket therein establishing first and second mold spaces, wherein said gasket is laterally movable relative to said mold surface in a direction into one of said first or second mold spaces.

DESCRIPTION OF THE PREFERRED EMBODIMENTS

Figure 1:
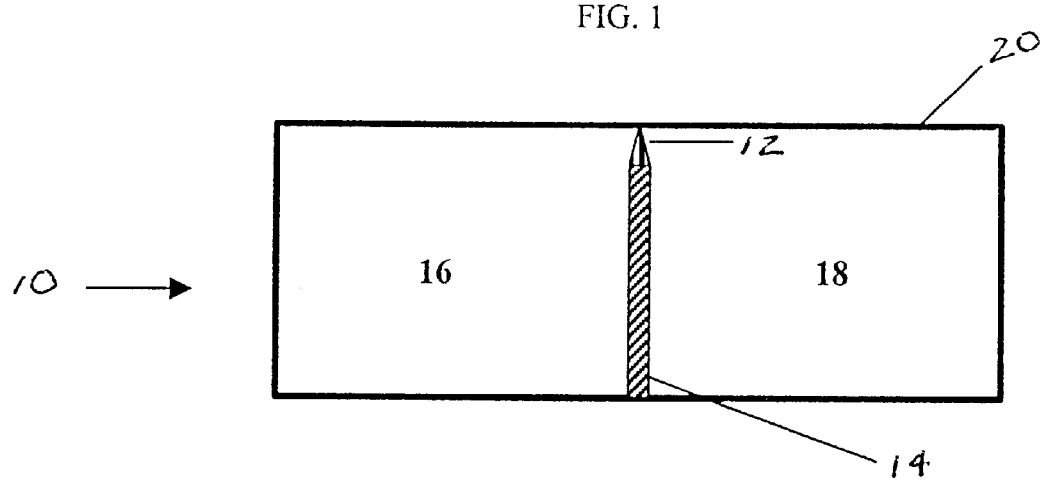
FIG. 1 herein is a schematic view of a preferred powder box mold containing a laterally movable separating gasket.

FIG. 1 illustrates in general schematic view a powder box molding apparatus 10. The apparatus 10 contains a separating gasket 12 which is preferably connected to a divider wall 14. In addition, gasket 12 is preferably an elastomeric material, such as a polysiloxane type rubber material, although other types of materials are suitable, including thermoplastic type material, thermoset material, and even metallic material.

Figure 2:
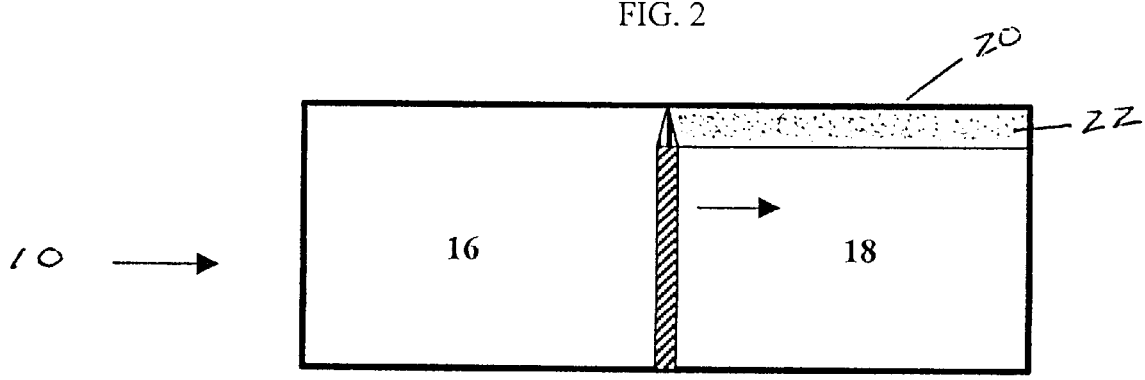
FIG. 2 herein is a further schematic view of a preferred powder box mold herein.

The powder box apparatus 10 in conjunction with the separating gasket 12 therefore defines a first 16 and second 18 mold space. The separating gasket 12 is laterally movable relative to said first 16 and second mold space 18 such that said gasket 12 is moved in a relative direction into one of said mold spaces 16 and 18. See FIG. 2 which indicates such relative motion by the arrow pointing into mold space 18. In such fashion, it can therefore be appreciated that gasket 12 therein acts to impose a sweeping type action across mold surface 20.

In the context of the present invention, such lateral type action can be achieved by moving said powder box apparatus 10 relative to mold surface 20, which would create such lateral action when gasket 12 is attached to divider wall 14, which divider wall is attached to apparatus 10. Alternatively, in the broad context of the invention herein, one can construct a system wherein gasket 12 attached to divider wall 14 can be moved relative to mold surface 20, which mold surface would remain fixed.

With the above in mind, the powder box apparatus is then taken through a powder fuse cycle which is carried out in accordance with known practice wherein the powder to be molded, comprising a first color, is placed in mold space 18. However, it is first preferable to preheat the mold surface 20 to an appropriate temperature as fast as possible. Typical preheating temperatures for a fuse cycle for a polyurethane type powder is about 270° C.

The powder to be molded 22 is then contacted on the preheated mold surface 20 for a short period of time, wherein such short period is designed such that it creates a state in the material such that the material has been imparted with a sufficient viscosity to flow when the separating gasket is subsequently laterally positioned relative to the mold surface. More specifically, the polymer powder resin 22 to be molded into a skin material is heated a selected amount to create a sufficient melt viscosity such that it will respond to the lateral sweeping action of the gasket 12 relative to the mold surface. Under these circumstances, the polymer resin will flow a sufficient amount to conform to the shape of the gasket surface and flow back on itself in the area immediate adjacent that area in contact with the gasket.

Figure 3:
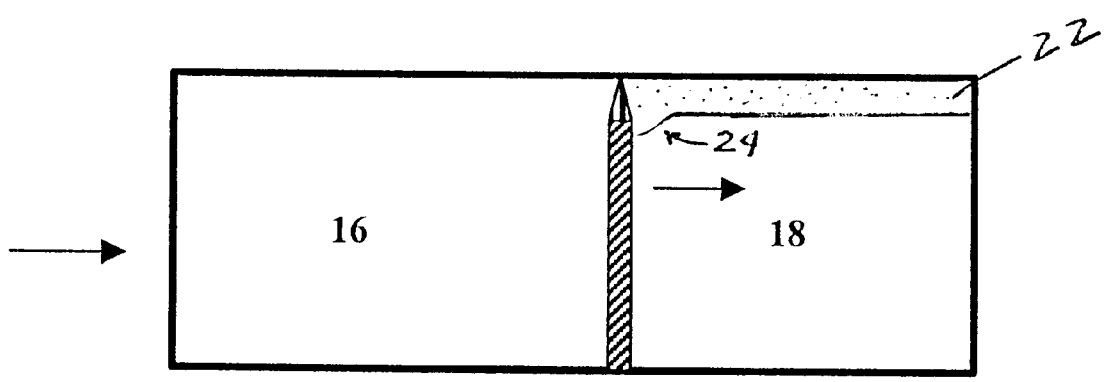
FIG. 3 herein is a further schematic view of a preferred powder box mold herein.

Such aspect of the present invention is illustrated in FIG. 3 which shows that upon lateral movement of gasket 12 into mold space 18 prior to solidification of powder resin layer 22 the material flows back upon itself to form thickened region 24. However, it is not necessary in the context of the present invention to form thickened region 24 to accomplish the objective of preparing a two-colored article with a distinct two-tone cast line. That is, the sweeping action upon lateral movement of gasket 12 need only be sufficient to form a distinct linear thickness for resin layer 22 for subsequent casting, as discussed below. However, in preferred embodiment, the gasket 12 contacts and seals against the mold surface, and remains sealed during the sweeping action.

Figure 4:
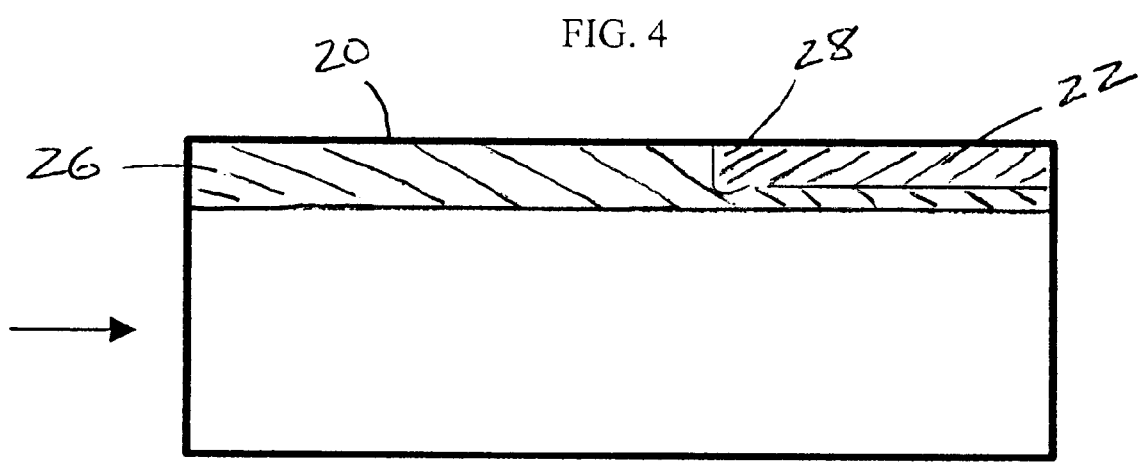
FIG. 4 herein is a further schematic view of a preferred powder box mold herein.

With attention to FIG. 4, it can be seen that once powder resin layer 22 is completely fused, and the gasket 12 has been laterally positioned to form thickened region 24, the gasket 12 and accompanying divider wall 14 are removed and a second powder box charge of powder resin is molded upon mold surface 20 which thereby joins with resin layer 22 to form a crisp two-tone cast line 28.

In accordance with the present invention, a typical powder casting process for a two color skin material includes the following general sequence:

1. preheat the mold surface 20 of powder box apparatus 10 containing gasket 12 attached to divider wall 14;
2. partially fuse a first charge of powder resin 22 and prior to complete fusion, laterally position gasket 12 into mold space 18
3. completely fuse powder resin 22;
4. charge said mold via a second powder box containing a second powder resin 26 of a color different from said first powder resin 22 and forming a crisp two-tone cast line 28.

Suitable thermoplastic casting material includes poly (vinyl chlorides) and related vinyl resins in dry powder form or in liquid slurry form for ease of gravity flow in the powder charge box during the casting/fusing operation. Typical of such PVC formulations include the following" PVC resin, plasticizer, stabilizer, release agents and color pigments, combined in a high intensity mixer to produce a dry flowable powder of each desired color. This is known as dry-blending.

Processing properties are such that when melting/fusing of the plastic powder occurs, densification results in reproduction of various details such as grains, marks, and engraved stitches formed in the mold surface.

Mold preheating temperatures may range from 250° F. to 500° F. since the thickness of the finished product is also governed by the time the powder is in contact with the mold, it should be understood that simultaneous charging of powder to the mold can be a definite advantage. Also, if certain areas of the mold can be made to have a lower temperature than others, it will permit molding a thinner skin in those areas, since temperature and mold-fill time effect the final skin thickness.

In one particular preferred embodiment of the present invention, the charge of polymer material to powder box apparatus 10 comprises a charge of plastic microspheres, said microspheres having an outside diameter in the range of 0.007–0.040". However, in the case of such microspheres, it has been found suitable herein, as noted above, to simply provide a mold having a mold surface, along with a gasket in the mold to define a first and second mold space, followed by molding a layer of a first colored material within one of said mold first and second mold spaces wherein said first colored material comprises a charge of plastic microspheres having an outside diameter in the range of 0.007–0.040", and removing said gasket and molding a layer of a second colored material. In such fashion, it should be noted that the need for the lateral movement of the gasket noted above is rendered unnecessary, as the use of the microspheres substantially reduces the amount of crossover that occurs in the case of powdered resin material.

In addition, in an even more preferred embodiment of the present invention, the above molding of the first colored material is followed with the molding of a second colored material, wherein said second colored material similarly makes use of plastic microspheres having diameters in the range of about 0.007–0.040".

Furthermore, in the context of the present invention, use herein is made of the light stable aliphatic thermoplastic urethane elastomer. Such improved light stable aliphatic based polyurethane elastomer composition comprises a hindered amine light stabilizer and a hindered phenol light stabilizer, along with antioxidant and pigment. The ratio of the hindered amine to hindered phenol stabilizer is in the range of about 1:1 to 2:1 and the concentration of the hindered amine light stabilizer and hinder phenol light stabilizer, antioxidant and pigment in the elastomer, based upon the entire product composition, is selected to provide a light stable elastomer following exposure to Xenon arc artificial weathering with a DE less than or equal to 3.00 after 2450 kilojoules of output.

As can be seen upon consideration of all the above, the industrial applicability of the invention herein includes the ability to form plastic/polymer type products containing a distinct molding line, which eliminates the need of vibratory devices in connection with powder box molding procedures. While the invention was described in illustrative manner with respect to, e.g., automotive automotive applications, many modifications and variations are possible in light of the above teachings. It is therefore understood that within the scope of the appended claims, the invention may be practiced otherwise than specifically described.

What is claimed is:

1. A method for making a joint line in a plastic article comprising the steps of:
    (a) providing a mold having a mold surface
    (b) providing a gasket in said mold against said mold surface wherein said gasket defines first and second mold spaces
    (c) molding a layer of a plastic material within one of said mold first and second mold spaces
    (d) laterally moving said gasket relative to said mold surface in a direction towards said mold space containing said plastic material during step (c) to therein form said joint line
    (e) removing said gasket from said mold surface and then molding a layer of a second plastic material within that mold space that does not contain said first plastic material wherein said second plastic material is joined to said first plastic material at said joint line.

2. The method of claim 1, wherein the molding step (c) comprises heating said first plastic material.

3. The method of claim 1 wherein said laterally moving said gasket relative to said mold surface comprises moving said gasket.

4. The method of claim 1 wherein said laterally moving said gasket relative to said mold surface comprises moving said mold.

5. The method of claim 1 wherein said gasket comprises a gasket wall in contact with said plastic material and said laterally moving said gasket relative to said mold surface in a direction towards said mold space containing said plastic material is such that said plastic material assumes the shape of said gasket wall.

6. The method of claim 1 wherein said plastic material is a thermoplastic or thermoset resin.

7. The method of claim 1 wherein said second plastic material is a thermoplastic or thermoset resin.

8. A method for making a molded two-colored article comprising the steps of:
    (a) providing a mold having a mold surface
    (b) providing a gasket in said mold wherein said gasket defines first and second mold spaces
    (c) molding a layer of a first colored material within one of said mold first and second mold spaces
    (d) laterally moving said gasket relative to said mold surface in a direction towards said mold space containing said first colored material
    (e) removing said gasket from said mold and then molding a layer of a second colored material within that mold space that does not contain said first colored material wherein said second colored material is joined to said first colored material at said joint line.

9. The method of claim 8 wherein the molding step (c) comprises heating said first colored material.

10. The method of claim 9 wherein step (d) is carried out during said heating of said first colored material.

11. The method of claim 8 wherein said laterally moving said gasket relative to said mold surface comprises moving said gasket.

12. The method of claim 8 wherein said laterally moving said gasket relative to said mold surface comprises moving said mold.

13. The method of claim 8 wherein said gasket comprises a gasket wall in contact with said first colored material and said laterally moving said gasket relative to said mold surface in a direction towards said mold space containing said first colored material is such that said first colored material assumes the shape of said gasket wall.

14. The method of claim 8 wherein said first colored material is a thermoplastic or thermoset resin.

15. The method of claim 8 wherein said second colored material is a thermoplastic or thermoset resin.

* * * * *